(12) United States Patent
Balfour (10) Patent No.: US 7,554,539 B2
(45) Date of Patent: Jun. 30, 2009

(54) SYSTEM FOR VIEWING A COLLECTION OF OBLIQUE IMAGERY IN A THREE OR FOUR DIMENSIONAL VIRTUAL SCENE

(75) Inventor: Robert E Balfour, Bethpage, NY (US)

(73) Assignee: Balfour Technologies LLC, Hicksville, NY (US)

( * ) Notice: Subject to any disclaimer, the term of this patent is extended or adjusted under 35 U.S.C. 154(b) by 332 days.

(21) Appl. No.: 11/190,317

(22) Filed: Jul. 27, 2005

(65) Prior Publication Data

US 2007/0024612 A1    Feb. 1, 2007

(51) Int. Cl.
*G06T 15/00* (2006.01)

(52) U.S. Cl. .................. 345/419; 345/427; 345/440; 345/629; 382/106; 382/284; 348/140; 707/E17.029; 707/E17.111

(58) Field of Classification Search .......... 345/419, 345/848, 475, 742, 474, 427, 629, 440; 382/284, 382/106; 358/101, 107; 356/141.5; 348/140
See application file for complete search history.

(56) References Cited

U.S. PATENT DOCUMENTS

| | | | | |
|---|---|---|---|---|
| 5,073,819 A | * | 12/1991 | Gates et al. | 348/140 |
| 5,986,670 A | * | 11/1999 | Dries et al. | 345/629 |
| 7,057,612 B2 | * | 6/2006 | Balfour | 345/419 |
| 2001/0038718 A1 | * | 11/2001 | Kumar et al. | 382/284 |
| 2003/0014224 A1 | * | 1/2003 | Guo et al. | 703/1 |
| 2004/0105090 A1 | * | 6/2004 | Schultz et al. | 356/141.5 |
| 2006/0238380 A1 | * | 10/2006 | Kimchi et al. | 340/995.1 |

OTHER PUBLICATIONS

Acquisition and Management of Urban 3-D Data Using CyberCity-Modeler; Armin Gruen and Xinhua Wang; Institute of Geodesy and Photogrammetry; Swiss Federal Institute of Technology (ETH) Zürich ETH Hönggerberg, CH-8093 Zürich, Switzerland.*

* cited by examiner

*Primary Examiner*—Kimbinh T Nguyen
(74) *Attorney, Agent, or Firm*—Ostrolenk Faber LLP (57) ABSTRACT

A system for selecting oblique images from a collection of geo-referenced oblique images and viewing them within the context of a virtual, three- or four-dimensional (3D space and time) geographic scene, providing the ability to analyze and interact with the oblique image being viewed. The system automatically selects and displays the best fit oblique image from an image warehouse based on the user's current 3D/4D viewpoint, and continuously maintains the geo-registration of the oblique image as the user adjusts the viewpoint.

29 Claims, 5 Drawing Sheets

SYSTEM FOR VIEWING A COLLECTION OF OBLIQUE IMAGERY IN A THREE OR FOUR DIMENSIONAL VIRTUAL SCENE

BACKGROUND OF THE INVENTION

1. Field of the Invention

The present invention relates to a system for selecting oblique images from a collection of geo-referenced oblique images and viewing them within the context of a virtual, three- or four-dimensional (3D space and time) geographic scene.

2. Description of the Prior Art

There are numerous examples in the prior art of systems and methods to select and view images from a collection of images. The most common technique uses a page of thumbnail image views; clicking on a specific thumbnail allows the user to view the desired image.

With respect to geographically referenced images, such as building interiors, exteriors or outside views, it is generally not the image content that drives the user's selection, but rather the image location. In such cases, user interfaces exist that allow the user to click or zoom in on a specific geographic location, and the appropriate image is selected and displayed. Some systems even display multiple images of different views of the same location or adjacent locations as thumbnails or mosaic images stitched together.

In the prior art, image mosaics are generally accomplished using ortho-images (i.e., image surfaces taken at a 90 degree angle to the camera lens). Interior or exterior panoramic views can be created as an image mosaic. With geo-referenced ortho-images, that is, where the image corners are located at a known latitude/longitude on the earth's surface, large image mosaics can be viewed for entire cities, states, countries, even the entire globe at various resolutions.

A recent addition to the substantial collection of geographic images has been the creation of geo-referenced oblique images, that is, images taken not where the subject is placed at a 90 degree angle to the camera lens. Most oblique images are taken at between 30-60 degree angles. Entire cities and states are beginning to take aerial inventories of their geographic and cultural features in great detail. This information is quite valuable if the large warehouses of oblique imagery can be easily accessed. Oblique images do not lend themselves to being stitched together into a mosaic like ortho-images do. To complicate things, the same location may be imaged at many different angles, not just one like an ortho-image. In the prior art, the best user interface to access these oblique imagery warehouses utilize a combination of map point-and-click and thumbnail selection techniques, or "hunt-and-peck" as some users have described the current state of the art.

Prior art oblique image tools do not disclose a system for automatically selecting oblique geo-referenced images from a large image warehouse and displaying for the user the selected image geo-registered within a 3D or 4D (if the images are also time-referenced) computer-generated virtual scene of the surrounding area. Such a system is necessary to provide a natural and easy interface for the user to effectively and efficiently access and analyze oblique imagery from a large image warehouse.

SUMMARY OF THE INVENTION

The present invention remedies the above deficiencies in oblique image viewing tools by providing the ability to automatically select the current oblique image of interest from a large image warehouse, based on the user's viewpoint within a virtual 3D/4D scene, and display that image geo-registered in the virtual 3D/4D scene.

It is therefore an object of the present invention to provide a system for automatic selection and retrieval of an oblique image of interest from a large warehouse of geo-referenced oblique imagery.

It is another object of the invention to provide a system to display selected oblique imagery geo-registered within a 3D/4D virtual scene.

It is yet another object of the invention to provide a system for maneuvering around geo-registered oblique images and visually interacting with them within a 3D/4D virtual scene.

The present invention makes it possible to automatically select and display oblique images within a 3D/4D virtual scene. The preferred embodiment of the present invention works within the context of a 3D or 4D viewer computer program which provides the rendering of and user interaction with a computer-generated virtual scene, such as "osgviewer" and "fourDscape" being two such non-limiting examples. Someone skilled in the art could also implement a 3D viewer directly using a computer programming language utilizing a low-level computer graphics library, C++/OpenGL being one such non-limiting example.

The system according to the invention has three main components which are preferably readily integrated together within the context of a 3D/4D viewer as understood by one skilled in the art. Alternatively, the invention may be embodied as a stand-alone computer program which also minimally renders a 3D background reference image, such as a map or aerial/satellite photo. The three main components are:

an oblique motion model component, which enables the user to move about an oblique image, as well as move through a 3D virtual scene tracking the user's current viewpoint; a selection process component, which automatically selects and retrieves the 'best fit' oblique image from an image warehouse for the users' current viewpoint; and a display process component, which presents the oblique image to the user geo-registered within the context of the 3D virtual scene.

The system according to the invention works as follows:

The user, preferably using a pointing device, such as a mouse or joystick being two such non-limiting examples, maneuvers through a 3D virtual (i.e. computer-generated) scene presented to the user on a display device, such as in a CRT or LCD display screen being two such non-limiting examples. Numerous motion models are commonly available for 3D viewing, such as drive, fly and trackball being three such non-limiting examples well known to someone skilled in the art.

At some point during the process, the user selects to maneuver through the 3D scene using the oblique motion model of the present invention, preferably via some common user interface technique, such as a keystroke or a pulldown menu being two such non-limiting examples. When the oblique motion model is selected, the user will see an oblique image displayed, selected as the best geographic fit based on the user's current viewpoint and orientation (and time if the oblique images are timestamped) from a warehouse of oblique imagery, geo-registered within the 3D virtual scene.

If the user is viewing an area not covered by the oblique images in the warehouse, the displayed oblique image may be off in the distance, but as the user, still having the oblique motion model selected, maneuvers through the 3D virtual scene to an area with coverage in the oblique image warehouse, the user will begin to see the best fit oblique image from the warehouse in the foreground near the center of the current user viewpoint. If the oblique image warehouse contains multiple oblique images of the same general location at various headings, which is common, different oblique images of the same general location can be viewed by the user as the user maneuvers by spinning around the current viewpoint, based on the user's current orientation.

Using the oblique motion model, the user can zoom down into the currently displayed oblique image geo-registered within the 3D virtual scene. With the user viewpoint within some user-configurable distance from the oblique image, the current oblique image will 'lock in place' within the 3D virtual scene (i.e. the oblique selection and geo-registration display functions of the present invention will be temporarily suspended), and the oblique motion model will digress into a "maneuvering mode" for flat image viewing, pan-zoom being one such common non-limiting example. As the user decides to zoom back out of the oblique image, the image will 'unlock' and the geo-registration display and automatic selection functions will again be activated.

In an alternative embodiment, the user can interact with the object images within the oblique image, such as by picking a point belonging to an object and measuring, being two such non-limiting examples of interaction using a pointing device, just as if the user were interacting with the underlying 3D object modeled in the 3D virtual scene. This can be accomplished when the oblique images contain images of 3D objects, buildings being one such non-limiting example, that are also represented by 3D models within the 3D virtual scene, since the oblique image contents are geo-registered within the 3D virtual scene.

In yet another embodiment of the present invention, dynamically moving 3D models, such as vehicles being one such non-limiting example, can be transposed onto the geo-registered oblique image being displayed, creating the visual effect of moving objects around and between object images within the oblique image being displayed. The moving objects in the 3D virtual scene obscured by the oblique image are displayed in the oblique image as flat 2D perspective image pixels resulting from a cull-draw process common to most computer graphics boards.

In yet another embodiment of the present invention, the oblique image warehouse can be created dynamically from an external image source, such as a real-time video stream from a calibrated traffic camera being one such non-limiting example. Each video frame from the real-time camera is preferably time-stamped and geo-referenced, based on the camera's calibration data, as it is received into the oblique image warehouse, which may contain video image frames from numerous real-time sources as well as static oblique imagery as previously described. These warehoused video frames can be accessed by the user just as any oblique image is selected and retrieved from the oblique image warehouse by the present invention. If the present invention is operating within the context of a 4D viewer, then the current simulated time is also used to select the latest time-stamped oblique image relative to the simulated time; otherwise the latest time-stamped image relative to actual time is selected.

The image warehouse exists locally or remotely from the 3D/4D viewer components of the present invention, with compressed or uncompressed images selected and/or retrieved via a communications medium, such as the internet, wired and/or wireless, being one such non-limiting example.

With a dynamic image warehouse, the remote image stream feeding the image warehouse can also be received over a communications medium.

BRIEF DESCRIPTION OF THE DRAWINGS

For the purpose of illustrating the invention, there is shown in the drawings an embodiment which is presently preferred; it being understood, however, that the invention is not limited to the precise arrangements and instrumentalities shown.

In the drawings, wherein like reference numerals denote like elements throughout the several views.

DETAILED DESCRIPTION OF THE PREFERRED EMBODIMENTS

Figure 1:
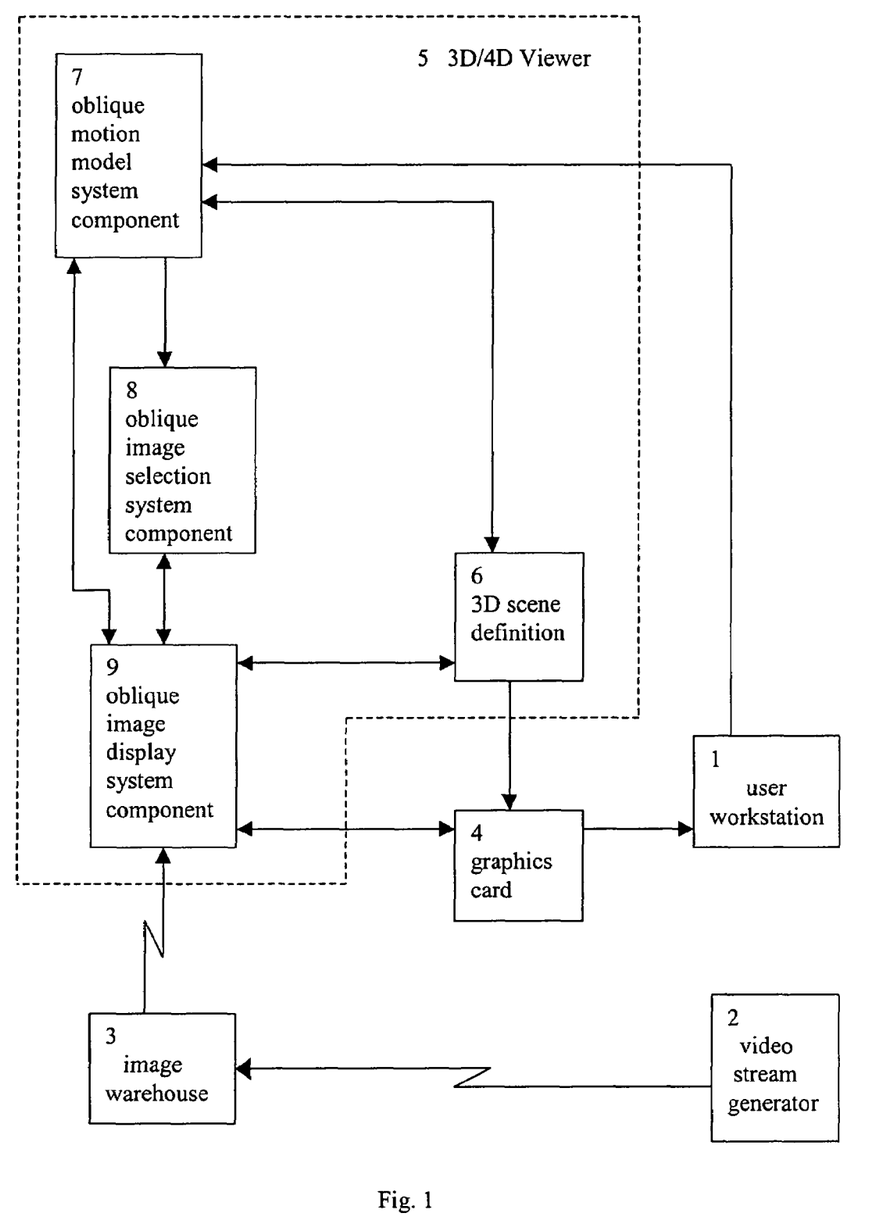
FIG. 1 is a block diagram of the system components according to the invention.

Referring now to the drawings, there is shown in FIG. 1 a block diagram of the system components according to the invention.

A user interacts with an oblique image enabled 3D/4D viewer (5) computer program through a user workstation (1). In the preferred embodiment the user workstation (1) is a laptop computer, although other embodiments may use other computer-based user interface devices, desktop and handheld computers being two such non-limiting examples.

Well-known functionality of prior art 3D/4D viewers takes a 3D scene definition (6) and renders it to a computer graphics card (4) to display the current view of the 3D/4D scene to the user on the user workstation (1). Although in a preferred embodiment, the 3D scene definition (6) is a scene graph, other data formats can serve equally well, such as relational data tables being one such non-limiting example. Also in a preferred embodiment, the computer graphics card (4) is physically contained within the user workstation (1), although a graphics card or subsystem remote from the user workstation can work equally well, provided the interface between graphics card (4) and user workstation has similar performance characteristics of a co-located system.

The system components according to the invention, namely the oblique motion model system component (7), the oblique image selection system component (8) and the oblique image display system component (9) extend the capabilities of the basic 3D/4D viewer (5) to enable the user to select, display and interact with oblique images within a 3D/4D scene automatically or substantially automatically. These oblique images are contained in an image warehouse (3). The preferred embodiment of the image warehouse (3) is a remote digital storage medium accessed via a wired or wireless communications medium, such as provided by an image server accessible over the internet being one such non-limiting example. In another embodiment, an image warehouse (3) is co-located on a storage medium within the user workstation (1). Yet a further embodiment dynamically loads all or some portion of the image warehouse (3) with time-stamped video frames received from a remote video stream generator (2), such as a traffic camera being one such non-limiting example.

Figure 4:
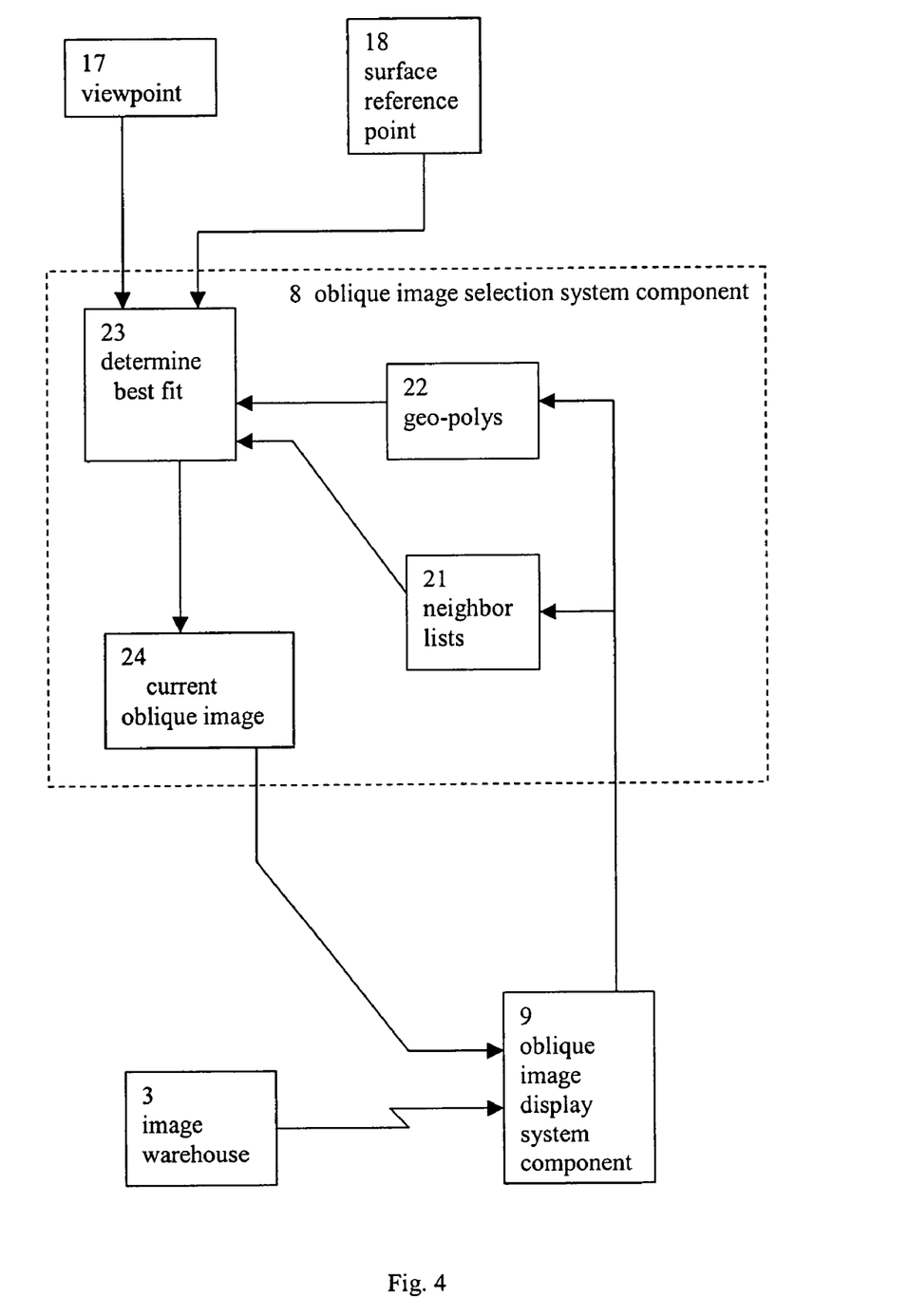
FIG. 4 is a diagram of the oblique image selection system component according to the invention.
Figure 5:
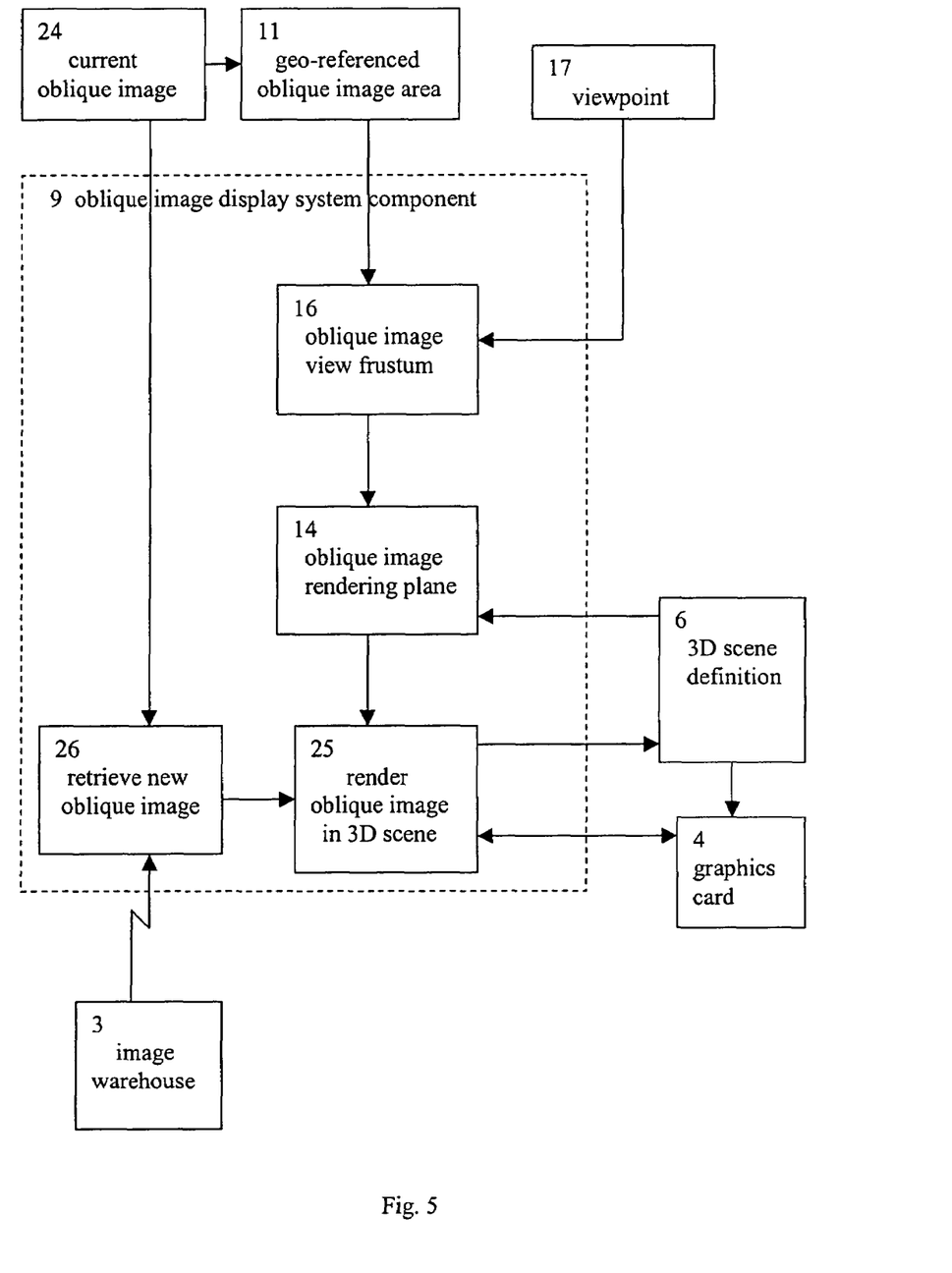
FIG. 5 is a diagram of the oblique image display system component according to the invention.

In operation, a user selects the oblique motion model as the currently active motion model in the 3D/4D viewer (5). For example, any one of numerous user interface techniques known in the prior art, such as a pull-down menu or keystroke being two such non-limiting examples can be used for user selection. When the user selects this model, the oblique imaging system components, including motion model (7), image selection (8) and image display (9), become active components of the 3D/4D viewer (5) display update cycle, which reacts to user workstation (1) user controls to recalculate and redisplay the appropriate 3D scene to the user, including a geo-referenced oblique image. These system components are illustrated in FIGS. 3-5.

Figure 2:
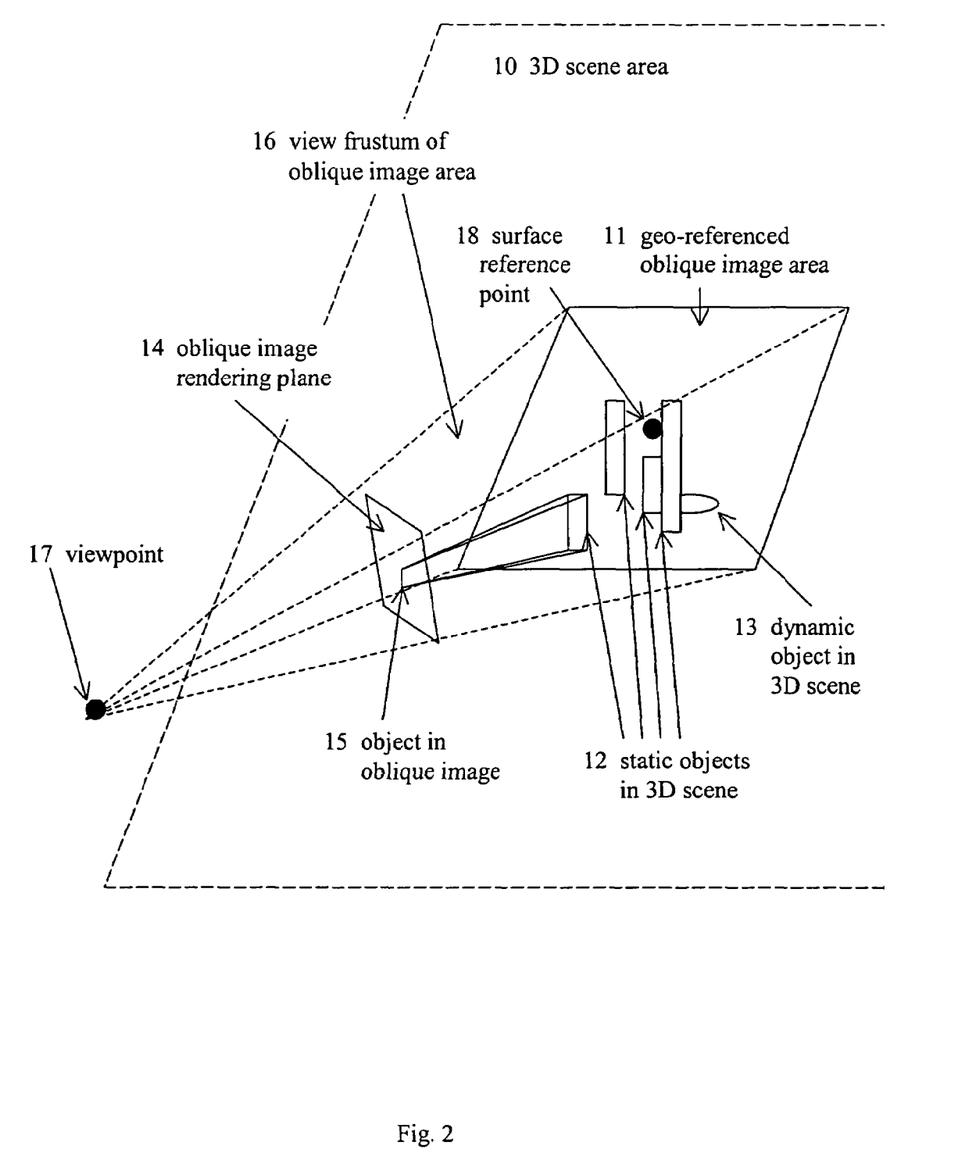
FIG. 2 is a diagram showing the geo-registration of a selected oblique image onto the 3D virtual scene.

Referring now to FIG. 2, there is shown a geometric diagram (not shown to scale) depicting spatial relationships between various 3D objects and calculated geometries used and produced by the system components (7, 8 and 9 of FIG. 1) according to the invention. These items will be further described in the context of the descriptions of these system components in FIGS. 3-5.

Figure 3:
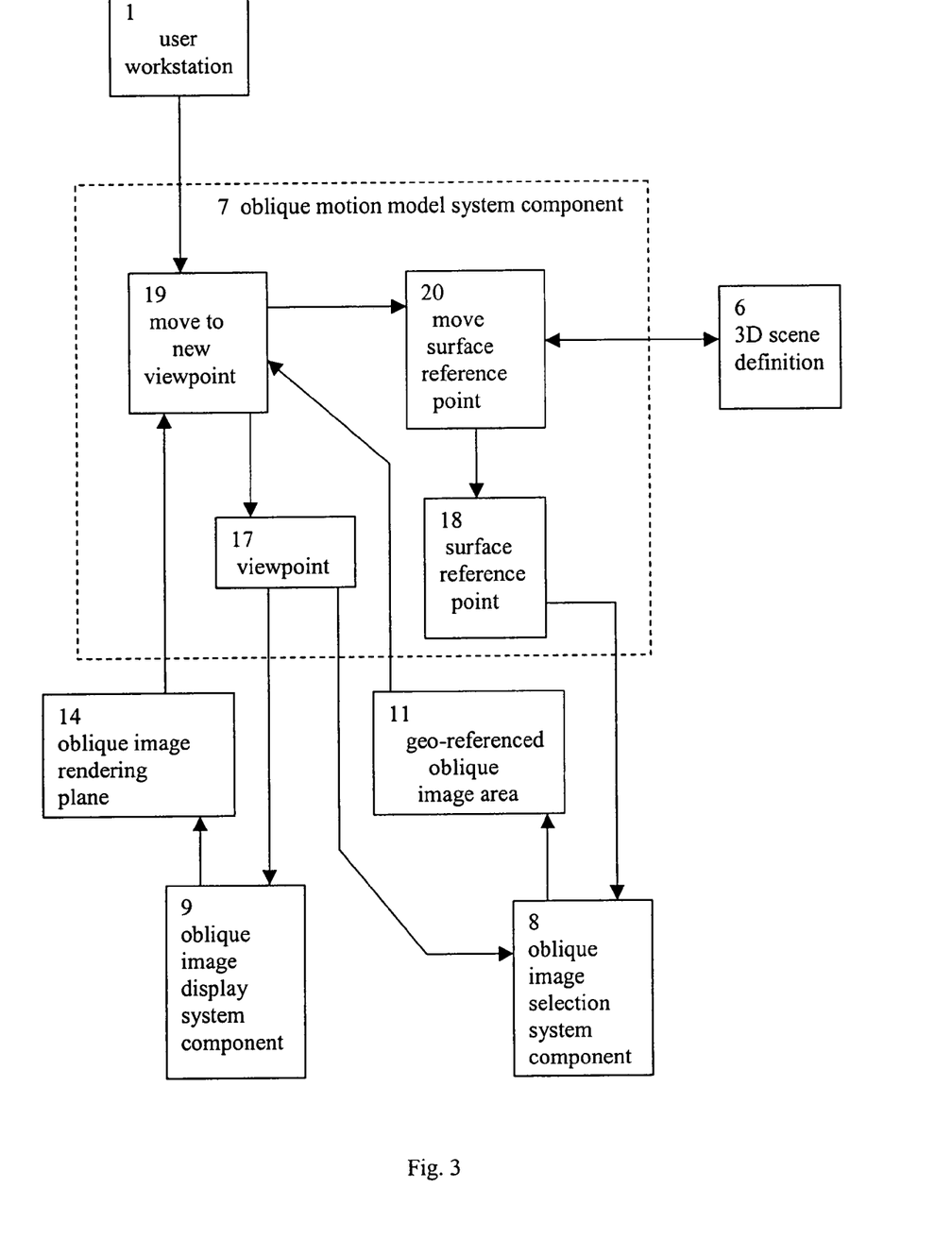
FIG. 3 is a diagram of the oblique motion model system component according to the invention.

Referring now to FIG. 3, there is shown a diagram of functions related to the oblique motion model system component (7). As shown in FIG. 3, the oblique motion model system component (7) takes input commands from a pointing device on the user workstation (1), such as a mouse or joystick being two such non-limiting examples, and uses the input commands to determine the user's new viewpoint (i.e., position and orientation) in the current 3D scene display on the user workstation (1).

The movement to a new viewpoint (17) is also influenced by two other factors. One factor is a geo-referenced oblique image area (11), which preferably also contains information on the oblique angle of the current oblique image from the image warehouse, which is referenced to maintain the angle of the viewpoint (17) vector relative to the plane of the geo-referenced image area (11) within a user-configurable deviation from the actual oblique image angle. This is preferably done to minimize any image distortion to a user-selected preference. The preferred embodiment keeps this angle deviation at less than 5 degrees, although the user can override this as desired.

A second factor is a currently displayed oblique image rendering plane (14) that is referenced to determine the proximity of the viewpoint (17) to the rendered oblique image. When the viewpoint is less than a user-configurable distance from the oblique image rendering plane, the current oblique image preferably locks in place within the 3D scene by disabling updates from the oblique image selection (8) and oblique image display (9) system components. While an oblique image is locked, the motion dynamics can be replaced with a more user-desirable movement control for the user to view the entire extent of the currently displayed oblique image up close in the 3D scene, such as by switching from free-fly to pan-zoom being one such non-limiting example.

In operation, when the user zooms back out from a locked oblique image beyond the user-configurable lock distance, the oblique image is unlocked, and complete oblique image system operations are re-enabled. Also, when an oblique image is not locked, the oblique motion model system component (7) also moves the surface reference point (20), which is used by the oblique image selection system component (8). The surface reference point (18) is the intersection point of the viewpoint vector with the base surface model in the 3D scene definition (6) to which the oblique images are geo-referenced.

Referring now to FIG. 4, there is shown a diagram of functions related to the oblique image selection system component (8), which is preferably first initialized with both geo-polys (22) and neighbor lists (21) image meta-data. The image warehouse (3) can be pre-processed to contain this meta-data, which is retrieved by the oblique image display system component (9) and sent to the oblique image selection system component (8) during the 3D/4D viewer (5) initialization cycle. In an embodiment where the image warehouse (3) also includes dynamically created images from a video stream generator (2), the meta-data for these dynamic images may not all be pre-calculated, but would be identified and provided to the oblique image selection system component (8) as updates to the geo-polys (22) and neighbor lists (21) data, as necessary.

The image warehouse (3) contents preferably include the actual oblique images to be utilized, either in a known compressed or uncompressed format (as either works with this system), and also include meta-data describing the images. In a preferred embodiment the images are compressed JPEG2000 files and identified by filename. For these geo-referenced oblique images, the geographic locations of the image corners are determined, for example, either automatically from a geo-registered camera device which created the images or defined through a manual geo-identification and registration process. From these data, both the image heading and image center point can be pre-calculated. The image center point need not be the actual center of each image's geographic image area (11). As known to those skilled in the art, oblique images contain higher resolution data in the lower part of the images (those surfaces are closer to the camera device that created the image). In a preferred embodiment, the image center point is pre-calculated offset into the lower half of the image. The geo-polys (22) data is a compilation of all this data for all images.

The image warehouse (3) meta-data also preferably contains neighbor lists (21), which can also be pre-calculated. For each oblique image in the warehouse, a list of all images (including itself) with a proximity within some user-configurable neighborhood area, such as a radius of 1000 meters being one such non-limiting example, is preferably compiled. In a preferred embodiment, spatially dense image warehouses have smaller neighborhoods, sparse ones have larger ones. Neighborhoods overlap, but are not so big as to create huge neighbor lists (21) or so small as to create empty neighbor lists. A good neighborhood size depends on the density/overlap of the oblique image set in the image warehouse.

With geo-polys (22) and neighbor lists (21) available to the oblique image selection system component (8), a current viewpoint (17) and surface reference point (18) from the oblique image motion model system component (7) are used as inputs, and when the current oblique image in the 3D scene is not locked, oblique image selection system (8) preferably determines a best fit (23) oblique image.

The best fit determination (23) is a heuristic with user-configurable scoring methods and weights. As a non-limiting example for discussion purposes, a preferred embodiment ranks all images in the immediate neighbor list (21) of the currently displayed oblique image by the images' heading deviance from the current viewpoint (17), preferably counted as 20% of the final heuristic score, and preferably eliminating any neighbor image with a heading deviance greater than 30 degrees. The other 80% of the final heuristic score is preferably based on the delta distance that the center point of each image (contained in the geo-polys (22) data) in the immediate neighbor list (21) is from the current surface reference point (18). If the highest scoring image is still the currently displayed oblique image, the current oblique image (24) remains unchanged for this 3D/4D viewer (5) update cycle. In a preferred embodiment, a 4D viewer (5) uses the current selected timeframe in the best fit determination (23) to also score images based on their time proximity, or eliminate for consideration any oblique images in the image warehouse (3) time-stamped in the future if simulated time in the 4D viewer is progressing forward, or time-stamped in the past if simulated time is progressing backwards.

If the best fit determination (23) identifies a new image, then, preferably the current oblique image (23) is set to this new oblique image. Alternatively, in another embodiment, the best fit determination (21) expedites the check to see if there is an even better fit right now, by re-running the best fit determination (23) using the newly identified best fit image and its neighbor list, and continuing this process until two consecutive best fit determinations (23) return the same image. In yet another embodiment, this oblique image selection system component is configured as a repeating background process instead of being activated directly within the 3D/4D viewer (5) display update cycle.

Referring now to FIG. 5, there is shown a diagram of functions related to the oblique image display system component (9). The oblique image display system component (9) takes as input from the other system components according to the present invention the current oblique image (24), which includes the definition of the geo-referenced oblique image area (11), and the current user viewpoint (17). From this is calculated the current oblique image view frustum (16). Within the oblique image view frustum (16) and orthogonal to the viewpoint (17) is calculated the oblique image rendering plane (14) (refer to FIG. 2 for the relative geometries). Although there are many potential positions of the oblique image rendering plane (14) within the oblique image view frustum (16), the preferred embodiment positions the oblique image rendering plane (14) as close to the geo-referenced oblique image area (11) as possible, while still staying foreground of all the 3D models in the 3D scene which the oblique image contains.

A variety of 3D rendering techniques can be used to determine the position of the oblique image rendering plane (14). For explanatory purposes (as a non-limiting example), the depth buffer of the graphics card (4) can be scanned within the area of the rendered 3D scene (6) encompassed by the oblique image view frustum (16) to identify the closest point to the current viewpoint (17), since this viewpoint (17) is also at the apex of the oblique image view frustum (16). In another non-limiting example, planar intersection tests with the 3D models in the 3D scene definition (6) contained within the oblique image view frustum (16) can be done to identify a location close to the 3D models, but without intersecting them. In an extreme example, the bottom corners of the oblique image rendering plane would be positioned at the bottom corners of the geo-referenced oblique image area (11), which may be done in the case where no 3D models are extruded within the area.

One skilled in the art will notice that as the user viewpoint (17) continues to change, so does the oblique image view frustum (16), which results in the oblique image rendering plane (14) and thus the oblique image continually being re-geo-registered with respect to the changing viewpoint (17). Preferably, this feature is temporarily disabled when an oblique image becomes locked.

When the current oblique image (24) is a new oblique image that has been selected, the system retrieves the new oblique image (26) from the image warehouse (3) as a whole or in progressive sections, and uncompresses it if it has been retrieved in a compressed format for efficient transmission. In the preferred embodiment, this retrieval process is asynchronous so as not to unduly delay the 3D/4D viewer (5) update cycle. As the image data becomes available, the process continues to render the oblique image in the 3D scene (25).

In a preferred embodiment, rendering the oblique image in the 3D scene (25) involves pasting the image on the oblique image rendering plane (14), also referred to in 3D graphics terms as applying a texture to a polygon. Since the resolution of an oblique image used as a texture is typically non-linear, especially in the vertical direction, the preferred embodiment breaks up the oblique image rendering plane (14) into a non-linear grid of rectangles having relative dimensions that are determined by an approximating function of the non-linearity of the oblique image. In operation, the better the chosen approximating function is, the better will be the 3D geo-registration of the objects depicted within the image. The preferred embodiment also employs "level-of-detail" techniques, as known to one skilled in the art, in order to allow for a progressive and efficient rendering of image detail as the viewpoint (17) moves closer to specific areas within the image. In the preferred embodiment, the level-of-detail rendering graph is specific to encompass just the area of the oblique image rendering plane (14), and the level-of-detail grid is similarly constrained to respect the rectangle boundaries within the non-linear grid of rectangles.

In a preferred embodiment, border decorations are added to the oblique image as the oblique image is rendered in the 3D scene (25). For explanatory purposes and in a non-limiting example, a simple black-line border is added for a non-locked oblique image, and a red-line border is added when the image is locked. In another non-limiting example, levels of transparency are used on the oblique image pixels around its border to make the oblique image appear to blend into the surrounding 3D scene. In this example, when the oblique image is locked, translucent sides of the oblique image view frustum can be used as a decoration to focus the user's attention to the oblique image.

In an alternative embodiment, dynamically moving 3D objects from the 3D scene (6) are added into the rendering of the oblique image in the 3D scene (25). Referring back to FIG. 2 for a visual layout of the discussion that follows, 3D scene dynamic objects (13) that move into the oblique image view frustum (16) behind the oblique image rendering plane (14) are obscured by the oblique image. Once within this portion of the oblique image view frustum (16), the location of a dynamic object in the 3D scene (13) can be reverse-projected up into the oblique image rendering plane (14) (just like the static objects in a 3D scene (12) are shown being projected up with respect to the oblique image view frustum (16)), in order to determine the dynamic object's appropriate location within the geo-registered oblique image being displayed. Besides location, two more things are preferably determined before the 3D dynamic object (13) is added to the oblique image: the portion of the 3D dynamic object (13) that is hidden behind other objects in the 3D scene (12); and the appropriate 2D perspective pixel representation of the 3D dynamic object. Both of these can be determined by referring to the results of a rendering of this pertinent portion of the 3D scene (6) in the graphics card (4). Graphics cards are currently distributed with rich features, such as stencil buffers, stencil tests, accumulation buffers, rendering geometry to texture buffers, copying frame buffer to texture buffers, and so on. Accordingly, there are numerous graphics features available to retrieve a properly culled 2D pixel representation of the dynamic 3D object (13) that is then added to the oblique image rendered on the oblique image rendering plane (14). In a non-limiting example, the 3D scene (6) is rendered into texture memory, both with and without the 3D dynamic object (13), using the oblique image view frustum (16) as the perspective rendering frustum with the oblique image rendering plane (14) as the front culling plane and the geo-referenced oblique image area (11) as the back culling plane; the difference represents the 2D pixels of the 3D dynamic object.

Since the oblique image is preferably rendered as a graphics texture, there are also a number of graphics card (4) features that can be used to accomplish the addition of these 3D object pixels to the oblique image as it is being rendered. As a non-limiting example, the 2D pixel representation of the 3D object is used as a 2D reference texture in a fragment shader program in the graphics card (4) that will override the actual oblique image pixels at these locations with the 3D object pixels as the image is displayed to the user.

In yet another embodiment, both dynamic objects (13) and static objects in a 3D scene (12) can be interacted with by the user in the currently displayed oblique image. As non-limiting examples of such interaction, the user can select/pick, measure, query, etc. objects from the oblique image geo-registered in the 3D scene. Since the 3D scene definition (6) that is obscured and geo-referenced by the oblique image actually exists relative to the oblique image view frustum (16), any pointing done by the user on the oblique image can be projected through the oblique image and into the actual 3D rendered scene, of which there are numerous graphics techniques and 3D/4D viewers (5) that interact with 3D rendered scenes. In one embodiment, multiple points on a currently displayed oblique image can be picked by the user, with the individual or cumulative distance between the points automatically calculated.

In even another embodiment, when a new oblique image is selected for display, again using levels of transparency, the previous oblique image is gradually faded out of the 3D scene display before it is completely removed from the 3D scene (6) while the new oblique image is gradually faded in until it is fully opaque.

Although the present invention has been described in relation to particular embodiments thereof, many other variations and modifications and other uses will become apparent to those skilled in the art, without departing from the spirit and scope of the invention.

What is claimed is:

1. A system to interactively view and analyze a collection of oblique images within a three-dimensional or four-dimensional virtual scene, the system comprising:
    a plurality of electronic geo-registered oblique images stored in an image warehouse,
    electronic meta-data describing the plurality of oblique images;
    electronic 3D virtual scene definition data that describe the contents of geographic areas depicted by the plurality of oblique images;
    an electronic 3D/4D viewer program operable to select and display at least one of the plurality of oblique images in the image warehouse, wherein the images are geo-registered within a 3D virtual scene; and
    a display of the 3D/4D viewer program operable for a user to view and interact with at least one of the plurality of oblique images that is geo-registered within the 3D virtual scene.

2. The system according to claim 1, further comprising:
    one or more remote video stream generator devices operable to provide geo-registered, time-stamped oblique images to be stored in the image warehouse.

3. The system according to claim 1, wherein the 3D/4D viewer program includes components for an oblique image motion model, oblique image selection and oblique image display during a display update cycle.

4. The system according to claim 3, wherein the oblique image motion model updates a current viewpoint location based on input from the user, and calculates an associated surface reference point.

5. The system according to claim 4, wherein a new viewpoint is constrained to maintain an angle with the reference surface in the 3D scene that stays within a user-defined deviance with respect to the image angle of the currently displayed oblique image.

6. The system according to claim 4, wherein the oblique image motion model is operable to:
    determine if the proximity of the current viewpoint location to a currently displayed oblique image is within a user-defined threshold; ,
    lock the oblique image in place by disabling auto image selection and continuous geo-registration functions; and
    unlock the oblique image when the current viewpoint location changes to be outside the user-defined threshold.

7. The system according to claim 6, wherein the oblique motion model automatically switches to a maneuvering mode for navigating in a flat, 2D oblique image during a period of time when the oblique image is locked.

8. The system according to claim 3, wherein the oblique image selection is determined automatically based on a current viewpoint location and a surface reference point, wherein a user-configurable best-fit heuristic function is utilized based on a current viewpoint heading with respect to available oblique image heading meta-data and a distance from the surface reference point with respect to all available oblique image geo-reference point meta-data.

9. The system according to claim 8, wherein the oblique image meta-data includes a list of geo-referenced polygons and neighbor lists with respect to each available oblique image enabling a user to logically navigate through the available oblique images, which may be dynamically updated as new oblique images become available in the image warehouse.

10. The system according to claim 8, wherein the best fit heuristic function is further based on a current simulated time with respect to all available oblique image time-stamp meta-data, within a 4D viewer and an image warehouse containing time-stamped oblique images.

11. The system according to claim 8, wherein the automatic oblique image selection function operates in a background process with respect to the 3D/4D viewer display update cycle.

12. The system according to claim 3, wherein the oblique image display function is based on an updated viewpoint and continuously re-geo-registers a currently displayed oblique image by re-applying the currently selected oblique image to a re-calculated oblique image rendering plane within a re-calculated oblique image view frustum.

13. The system according to claim 12, wherein the oblique image rendering plane is positioned in an oblique image view frustum foreground of all 3D model surfaces in the 3D scene which are contained within the currently selected oblique image.

14. The system according to claim 3, wherein the oblique image selection component is operable to retrieve an oblique image from the image warehouse when a new image is selected by a user.

15. The system according to claim 14, further comprising an image retrieval and conditional un-compression function that operates in a background process with respect to the display update cycle.

16. The system according to claim 14, wherein the oblique image may be retrieved from the image warehouse in whole or in sections, wherein each section incorporates increased image detail with respect to each image section.

17. The system according to claim 12, wherein a mathematical function is operable to approximate a non-linearity of the oblique image contents and to segment the oblique image rendering plane into a non-linear grid of rectangles to which the appropriate sections of the oblique image is applied.

18. The system according to claim 12, wherein the oblique image is gridded to employ a level-of-detail rendering technique, with the level-of-detail grid constrained to respect the segmentation boundaries of the non-linear grid also applied to the oblique image.

19. The system according to claim 12, wherein decorations are selectively added to the oblique image being rendered, based on its state of locked, unlocked, old or new, including colored border lines, transparent pixels and translucent oblique image frustum sides.

20. The system according to claim 12, wherein 2D pixel representations of dynamically moving 3D objects in the 3D scene contained within the oblique image view frustum behind the currently display oblique image are added to the oblique image as the currently displayed oblique image.

21. The system according to claim 20, wherein the 2D pixel representations of dynamic 3D objects account for parts of the 3D object being obscured by 3D objects contained within the currently displayed oblique image.

22. The system according to claim 12, wherein the user can pick a point on the currently displayed oblique image that can be identified as belonging to a specific 3D object in the 3D scene.

23. The system according to claim 22, wherein multiple points on the currently displayed oblique image can be picked by the user, with the individual or cumulative distance between the points automatically calculated.

24. The system according to claim 1, wherein the image warehouse is co-located on a local storage medium on a computer platform containing the 3D/4D viewer adapted for oblique image display and operated by the user.

25. The system according to claim 1, wherein the image warehouse is located on a remote storage medium which transmits oblique image data and meta-data to the adapted 3D/4D viewer program via a communications medium.

26. The system according to claim 1, wherein the meta-data for all the oblique images contained in the image warehouse, including geo-reference points, logical center point and heading and neighbor list are pre-computed and updated as new images are added to the image warehouse.

27. The system according to claim 1, wherein the oblique images in the image warehouse are stored and transmitted in a compressed format.

28. The system according to claim 1, wherein the 3D virtual scene definition is a scene graph.

29. The system according to claim 1, further comprising a computer graphics platform that is a mobile wireless device comprising at least one of a laptop, handheld and wearable computing device.

* * * * *